UNITED STATES PATENT OFFICE.

KARL SCHIRMACHER, OF SODEN, GERMANY, ASSIGNOR TO THE FARBWERKE, VORMALS MEISTER, LUCIUS & BRÜNING, OF HÖCHST-ON-THE-MAIN, GERMANY.

WOOL DYE AND PROCESS OF MAKING SAME.

SPECIFICATION forming part of Letters Patent No. 665,696, dated January 8, 1901.

Application filed October 30, 1900. Serial No. 34,880. (Specimens.)

*To all whom it may concern:*

Be it known that I, KARL SCHIRMACHER, Ph. D., a citizen of the Empire of Germany, residing at Soden, near Höchst-on-the-Main, in the Empire of Germany, have invented certain new and useful Improvements in the Manufacture of Wool Dyestuffs, of which the following is a specification.

I have found that ortho-ortho-diamido-oxy compounds may be employed for the manufacture of azo dyestuffs. They are easily diazotized. The resulting tetrazo derivatives are stable and easily converted with amins or phenols into disazo dyestuffs. I have observed this property with the ortho-ortho-diamido-chlorophenol, ortho-ortho-diamido-para-cresol, ortho-ortho-diamido-para-oxybenzoic acid, and ortho-ortho-diamido-para-phenolsulfonic acid and have found that the latter yields a valuable dyestuff with beta-naphthol.

I illustrate my process as follows: 20.4 kilograms of ortho-ortho-diamidophenolsulfonic acid, which may be obtained by reduction of ortho-ortho-dinitro-para-phenolsulfonic acid, are transformed with sixty kilograms of hydrochloric acid and 14.4 kilograms of sodium nitrite into the easily-soluble yellow tetrazo compound, and the solution of the latter is gradually added to a solution of 14.6 kilograms of beta-naphthol and sixty kilos of soda-lye. The formation of the dyestuff is soon effected. It can be separated from the solution by means of common salt. It is obtained as a blue-black powder, the aqueous violet solution of which turns red on addition of mineral acids. It dyes wool red brown, which on subsequent treatment with chromium turns to a fast violet black.

Having now described my invention, what I claim is—

1. The herein-described process for the manufacture of a dyestuff, which consists in diazotizing ortho-ortho-diamido-para-phenolsulfonic acid and in combining it with beta-naphthol, substantially as set forth.

2. As a new product the dyestuff obtained by combining the diazotized ortho-ortho-diamido-para-phenolsulfonic acid with beta-naphthol, being easily soluble in water to a violet coloration, its solution becoming red on addition of mineral acids and which dyes wool red brown, the shade turning blue black on subsequent treatment with chromates, substantially as set forth.

In testimony that I claim the foregoing as my invention I have signed my name in presence of two subscribing witnesses.

KARL SCHIRMACHER.

Witnesses:
  HEINRICH HAHN,
  ALFRED BRISBOIS.